United States Patent [19]

Imafuji et al.

[11] Patent Number: 5,617,177
[45] Date of Patent: Apr. 1, 1997

[54] CAMERA HAVING FUNCTION OF CORRECTING SHAKE

[75] Inventors: Kazuharu Imafuji, Kawasaki; Nobuhiko Terui, Ichikawa, both of Japan

[73] Assignee: Nikon Corporation, Tokyo, Japan

[21] Appl. No.: 578,394

[22] Filed: Dec. 26, 1995

Related U.S. Application Data

[63] Continuation of Ser. No. 207,261, Mar. 8, 1994, abandoned, which is a continuation of Ser. No. 132,913, Oct. 7, 1993, abandoned.

[30] Foreign Application Priority Data

Oct. 9, 1992 [JP] Japan ................................. 4-271288

[51] Int. Cl.$^6$ ............................. G03B 7/08; G03B 17/00
[52] U.S. Cl. ............................................ 396/53; 396/55
[58] Field of Search ..................... 354/70, 202, 195.12, 354/400, 430

[56] References Cited

U.S. PATENT DOCUMENTS

| | | | |
|---|---|---|---|
| 5,062,696 | 11/1991 | Oshima et al. | 359/554 |
| 5,107,293 | 4/1992 | Sekine et al. | 354/430 |
| 5,109,249 | 4/1992 | Kitajima | 354/430 |
| 5,198,856 | 3/1993 | Odaka et al. | 354/430 |
| 5,231,445 | 7/1993 | Onuki et al. | 354/410 |
| 5,266,988 | 11/1993 | Washisu | 354/70 |

Primary Examiner—Safet Metjahic
Assistant Examiner—Nicholas J. Tuccillo
Attorney, Agent, or Firm—Shapiro and Shapiro

[57] ABSTRACT

In a camera having a function of correcting a shake, a value of angular velocity or of velocity output from a sensor for detecting the shake is differentiated twice to obtain the differential value of the angular acceleration or the acceleration. When the resultant differential value of the angular acceleration or the acceleration is equal to 0, the angular velocity or the velocity is considered to be equal to 0. According to the obtained angular velocity or the velocity, the velocity or the angular velocity of the sensor for detecting the shake is corrected.

44 Claims, 5 Drawing Sheets

CAMERA HAVING FUNCTION OF CORRECTING SHAKE

This is a continuation of application Ser. No. 08/207,261 filed Mar. 8, 1994, which is a continuation of application Ser. No. 08/132,913 filed Oct. 7, 1993, both now abandoned.

BACKGROUND OF THE INVENTION

1. Field of the Invention

The present invention relates to a camera having a function of correcting a shake, which detects an unintentional movement of hands in taking a picture, drives part of an optical system and corrects for said movement of the hands in order to prevent a blurred image.

2. Related Background Art

A typical apparatus used in a camera for correcting an unintentional movement of hands in taking a picture detects a shake of the camera caused by the movement of the hands by means of a shake detection device such as an angular velocity sensor availing itself of the Corioli's force, an acceleration sensor employing, for example, a piezoelectric element, or the like. An appropriate amount of correction is then calculated on the basis of the detected shake. A correcting lens is moved up and down as well as right and left according to the resultant appropriate amount of correction in order to correct an optical path.

As an actuator for driving the correcting lens, a voice coil, a motor, or the like is employed.

In such apparatus, the output from the shake detection sensor such as the angular velocity sensor or the velocity sensor which is used in the shake correction apparatus 'drifts' (that is, varies with time) depending on the characteristics of the sensor itself and temperature. Thus, the output when velocity is 0 is not constant. Accordingly, it is difficult to judge whether the sensor stands still or not and to detect angular velocity or velocity with precision. And the 'drift' of the output of the shake detection sensor becomes an error of correction.

SUMMARY OF THE INVENTION

An object of the present invention is to provide a shake correction apparatus which easily and precisely detects angular velocity or velocity and prevents an error of correction caused by a drift of the output of a shake detection sensor.

According to the present invention, the angular velocity or the velocity output from the shake detection sensor is differentiated twice, that is, a differential value of the angular acceleration or the acceleration is obtained. When the resultant value is 0, the angular velocity or the velocity is judged to be 0. The velocity or the acceleration of the shake detection sensor is corrected accordingly.

According to the present invention, since the velocity or the acceleration of the angular velocity sensor is corrected when the angular velocity is 0, it is possible to judge whether the sensor stands still or not and to detect angular velocity or the velocity with precision without an error of correction, even if the output of the angular velocity sensor for shake detection drifts.

DESCRIPTION OF THE PREFERRED EMBODIMENT

An embodiment according to the present invention will be described with reference to the drawings.

Figure 1:
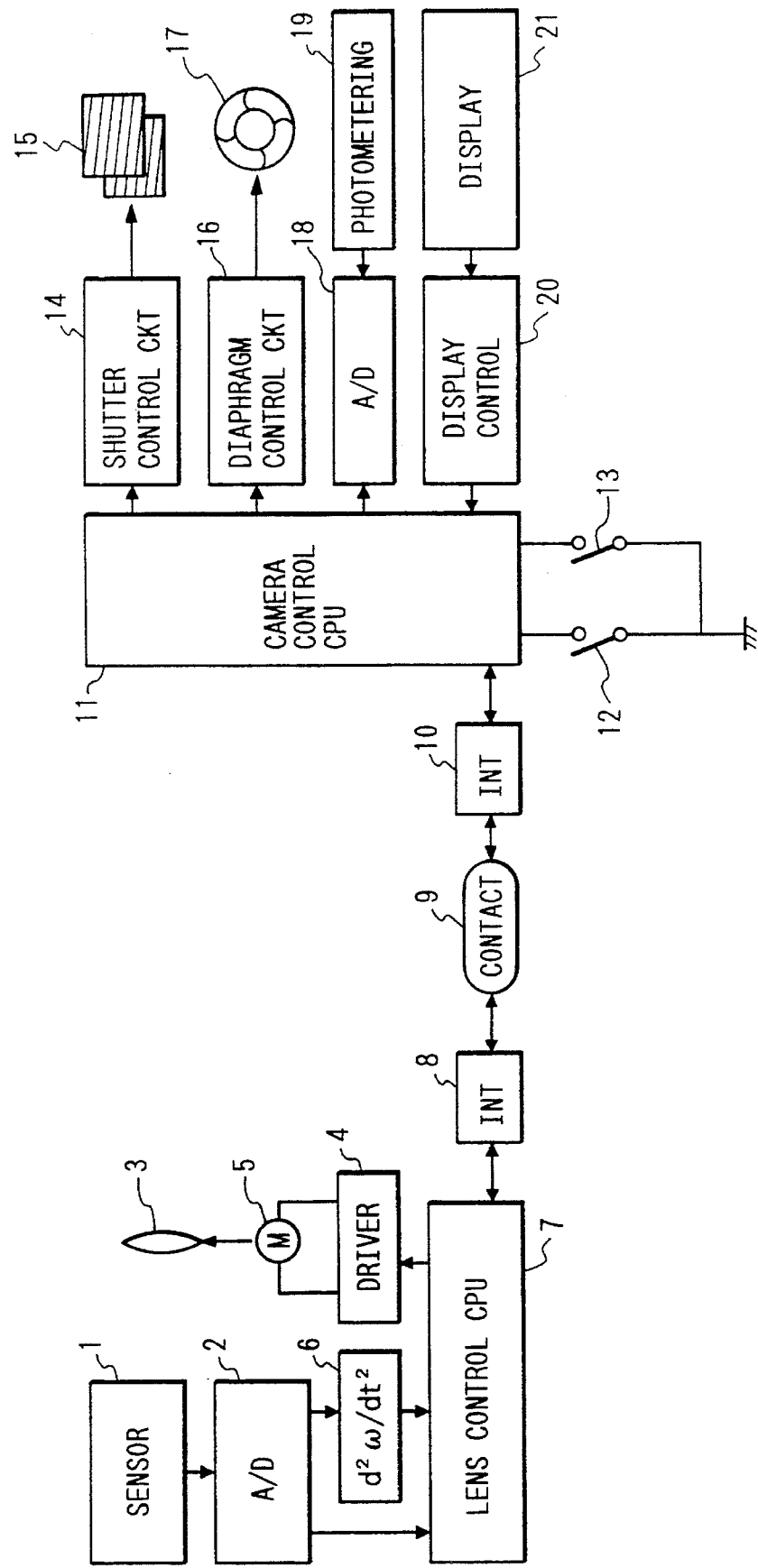
FIG. 1 is a block diagram showing an embodiment of the apparatus according to the present invention for correcting a shake of a camera caused by an unintentional movement of hands in taking a picture.

FIG. 1 is a block diagram of the embodiment.

A control system of this embodiment comprises a CPU 11 for controlling a camera and a CPU 7 for controlling a lens. A sensor 1 for detecting the angular velocity of a shake of the camera caused by an unintentional movement of the hands applies a detecting signal to an A/D converter 2. The output of the A/D converter 2 is applied to the CPU 7. Also, the output of the A/D converter 2 is differentiated by a differentiator 6 and is applied to the CPU 7 as the differential value of the angular acceleration of the movement of the hands. The CPU 7 calculates the moving speed of an image on an image surface given by the movement of the hands on the basis of the output signal applied through the A/D converter 2 from the sensor 1, the focal distance of the lens, and so on. An appropriate amount of correction of the shake is calculated on the basis of said calculated value.

A motor 5 for correcting the shake is driven by a driver 4 according to the output from the CPU 7, whereby the shake is corrected by shifting a correcting lens 3 by the amount of correction of the blurred image calculated by the CPU 7.

Signals are applied to the CPU 11 for controlling the camera when a release button provided in the main body of the camera is depressed. More specifically, when the release button is half depressed, a photometering and distance-measuring switch 12 (SW1) is turned on. When the release button is further depressed, the release switch 13 (SW2) is turned on, and a shutter 15 is opened and shut to perform photographing operation. A leading curtain and a trailing curtain of the shutter 15 are driven by a shutter control circuit 14 according to the output of the CPU 11. A diaphragm 17 is controlled by a diaphragm control circuit 16 according to the output of the CPU 11. A display control circuit 20 displays photographing information, warning of a shake, and so on in a display unit, such as an LCD, according to the output of the CPU 11.

A signal which is used for detecting information of the brightness of an object is output from a photometering element 19 and is applied through an A/D converter 18 to the CPU 11. The CPUs 7 and 11 exchange signals through an interface 8, a contact 9 and an interface 10. The CPU 11 for controlling the camera receives the result of judgement about whether the lens has a function of correcting the shake or not, information about the focal length of the lens and the full open value of the lens form the CPU 7 for controlling the lens. The CPU 7 receives a half-depression signal, a release signal and an exposure and signal from the CPU 11.

Figure 2:
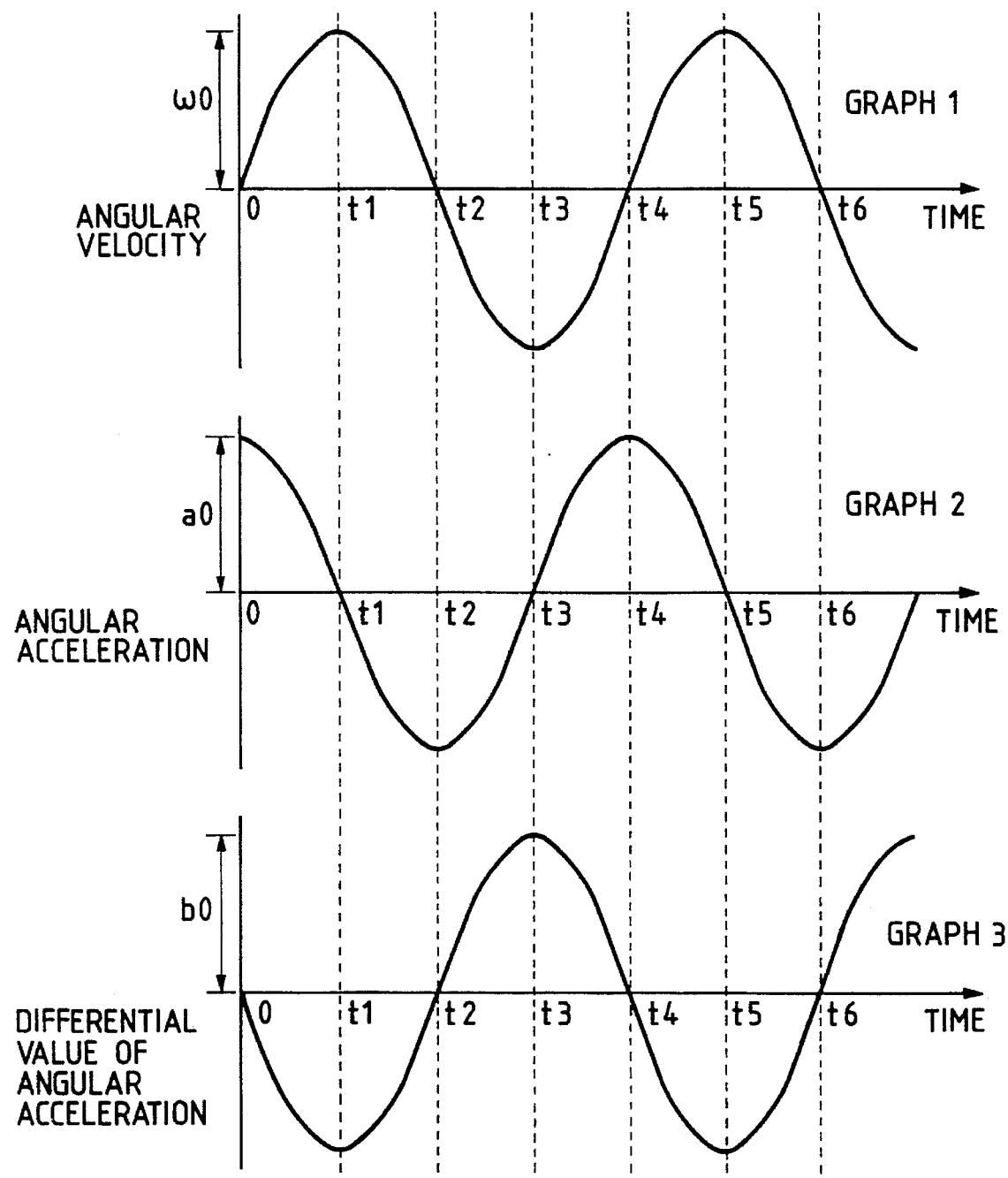
FIG. 2 shows graphs respectively showing angular velocity detected by the angular velocity sensor, the angular acceleration obtained from said angular velocity and the differential value of said angular acceleration.

FIG. 2 shows graphs respectively showing the angular velocity detected by the angular velocity sensor 1, the angular acceleration obtained by differentiating the angular velocity and the 10 differential value of the angular acceleration.

As shown in the graph 1 of FIG. 2, if the angular velocity detected by the angular velocity sensor is expressed as $$\omega = \omega 0 \sin 2\pi ft \quad (1)$$

Then, as shown in the graph 2, the angular acceleration can be expressed as $$d\omega/dt = a0 \cos 2\pi ft \quad (2)$$

And, as shown in the graph 3, the differential value of the angular acceleration can be expressed as $$d^2\omega/dt^2 = -b0 \sin 2\pi ft \quad (3)$$

In the above equations (1), (2) and (3), $\omega 0$, $a0$ and $b0$ are all coefficients.

As is clearly understood from the graphs 1 and 3, when the angular velocity is equal to 0 (time t=0, t2, t4, t6), the differential value of the angular acceleration is also equal to 0.

Accordingly, when the value obtained by twice differentiating the angular velocity output from the angular velocity sensor is 0, the angular velocity is also 0.

Figure 3:
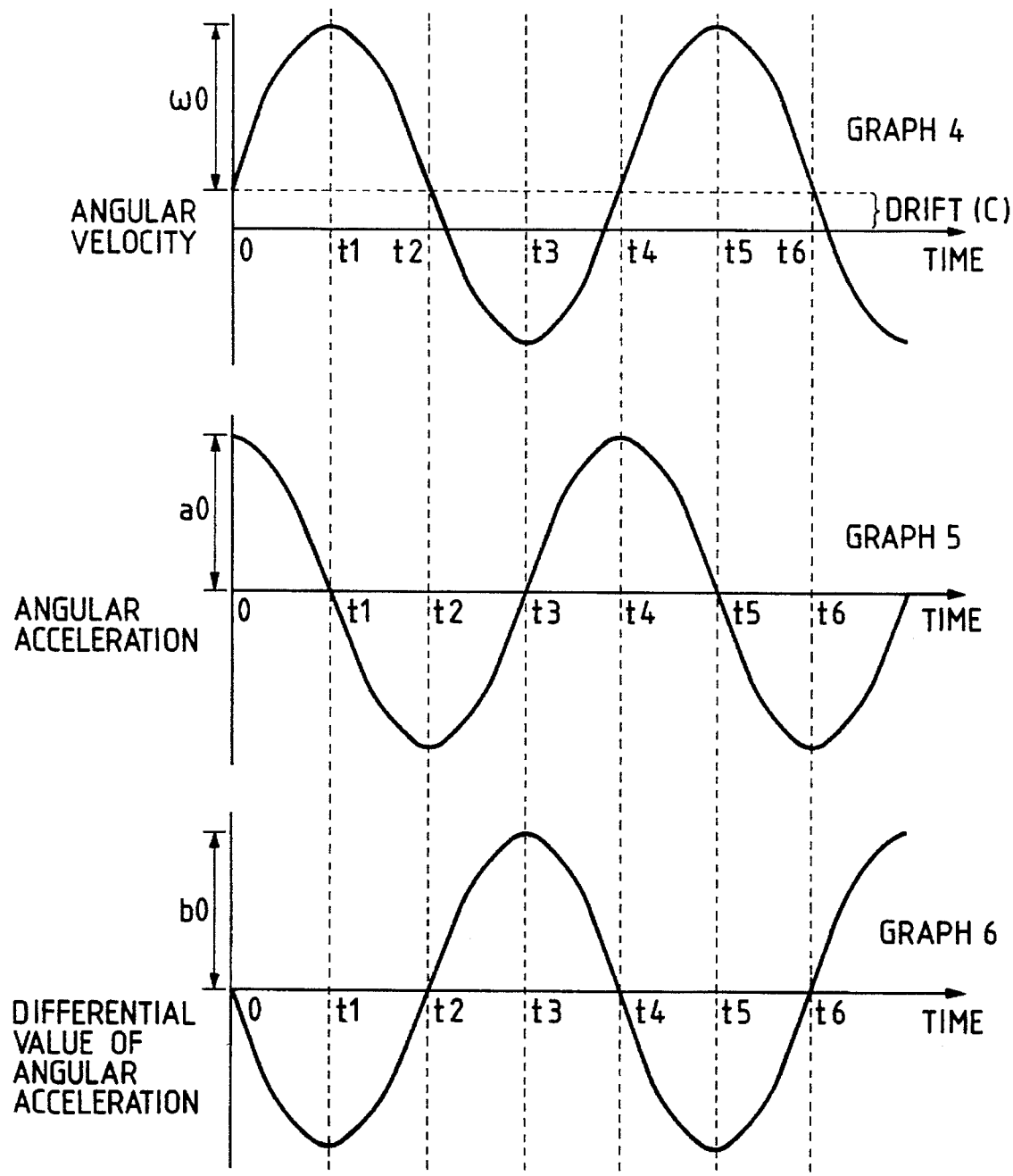
FIG. 3 shows graphs respectively showing the angular velocity, the angular acceleration obtained from said angular velocity and the differential value of said angular acceleration when the output of the angular velocity sensor drifts for some reason.

FIG. 3 shows graphs respectively showing the angular velocity, the angular acceleration obtained from the angular velocity and the differential value of the angular acceleration when the output of the angular velocity sensor drifts for some reason. If the output of the angular velocity sensor drifts by C, the angular velocity after the drift can be expressed as $$\omega 2 = \omega 0 \sin 2\pi ft + C \quad (4)$$

In this case, also, the angular acceleration can be expressed as in the above equation (2) without the drift, that is, as $$d\omega 2/dt = a0 \cos 2\pi ft \quad (5)$$

Similarly, the differential value of the angular acceleration can be expressed as in the above equation (3) without the drift, that is, as $$d^2\omega 2/dt^2 = -b0 \sin 2\pi ft \quad (6)$$

The foregoing shows that, even if the output of the angular velocity sensor drifts, the angular acceleration and the differential value thereof remain the same.

In other words, even if the output of the angular velocity sensor drifts and causes an error, the angular acceleration and the differential value of the angular acceleration do not change regardless of the drift but remain free from the error. Thus, by judging the real angular velocity to be equal to 0 when the differential value of the angular acceleration is 0 (t=0, t2, t4 and t6), the error caused by the drift can be reduced.

For the above-mentioned reason, the CPU 7 has the differentiator 6 to differentiate twice the angular velocity signal from the angular velocity sensor 1 to obtain the differential value of the angular acceleration. When the differential value of the angular acceleration is equal to 0, the angular velocity is judged to be equal to 0 and the velocity of the correcting lens 3 is set to be 0 in order to correct the error.

Figure 4:
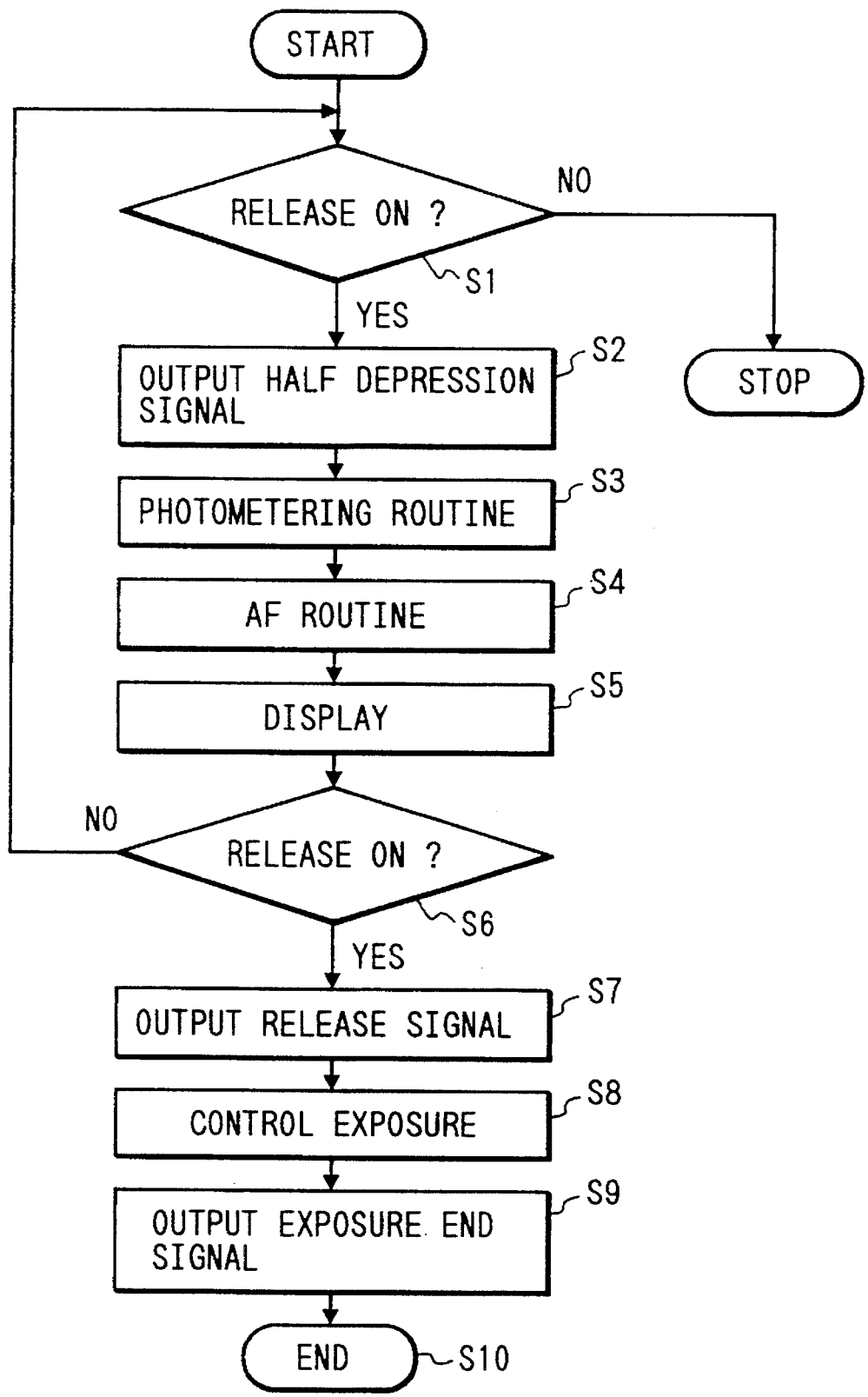
FIG. 4 is a flowchart for the operation of a camera according to the embodiment.

Now, the operation of the camera according to the present invention will be described with reference to the flowchart in FIG. 4.

(Step S1)

Whether the photometering and distance-measuring switch 12(SW1) is turned on or not is judged. If the switch is turned off, the operation is stopped at once.

(Step S2)

If the photometering and distance-measuring switch 12 is judged to be turned on in Step S1, the half-depression signal is applied to the CPU 7 for controlling the lens in order to inform the CPU 7 that the camera is in the half-depression state.

(Step S3)

The photometering routine is started, where the photometry information about the brightness of the object is received and the lens opening value and the shutter speed are determined so as to realize appropriate exposure.

(Step S4)

AF(auto-focusing) routine is started, where range information is received and the focusing operation is performed.

(Step S5)

The shutter speed and the lens opening value determined in Step S3 are displayed.

(Step S6)

Whether the release switch SW2(13) is turned on or not is judged. If the switch is judged to be turned off, the operation returns to Step S1, and a series of operation from Step S1 to Step S5 will be repeated until the switch SW1(12) is turned off.

(Step S7)

If the release switch SW2(13) is judged to be turned on in Step S6, a release signal is applied to the CPU 7 to inform the CPU 7 that the release switch SW2(13) is turned on.

(Step S8)

The diaphragm 17 is stopped down by the diaphragm control circuit 16 to the stop value determined in Step S3, and a mirror is lifted. After controlling the diaphragm and lifting up the mirror, the shutter control circuit 14 drives the leading curtain and the trailing curtain of the shutter 15 according to the shutter speed determined in Step S3.

(Step S9)

After exposure, the exposure end signal is applied to the CPU 7 in order to inform the CPU 7 that the exposure is finished.

Figure 5:
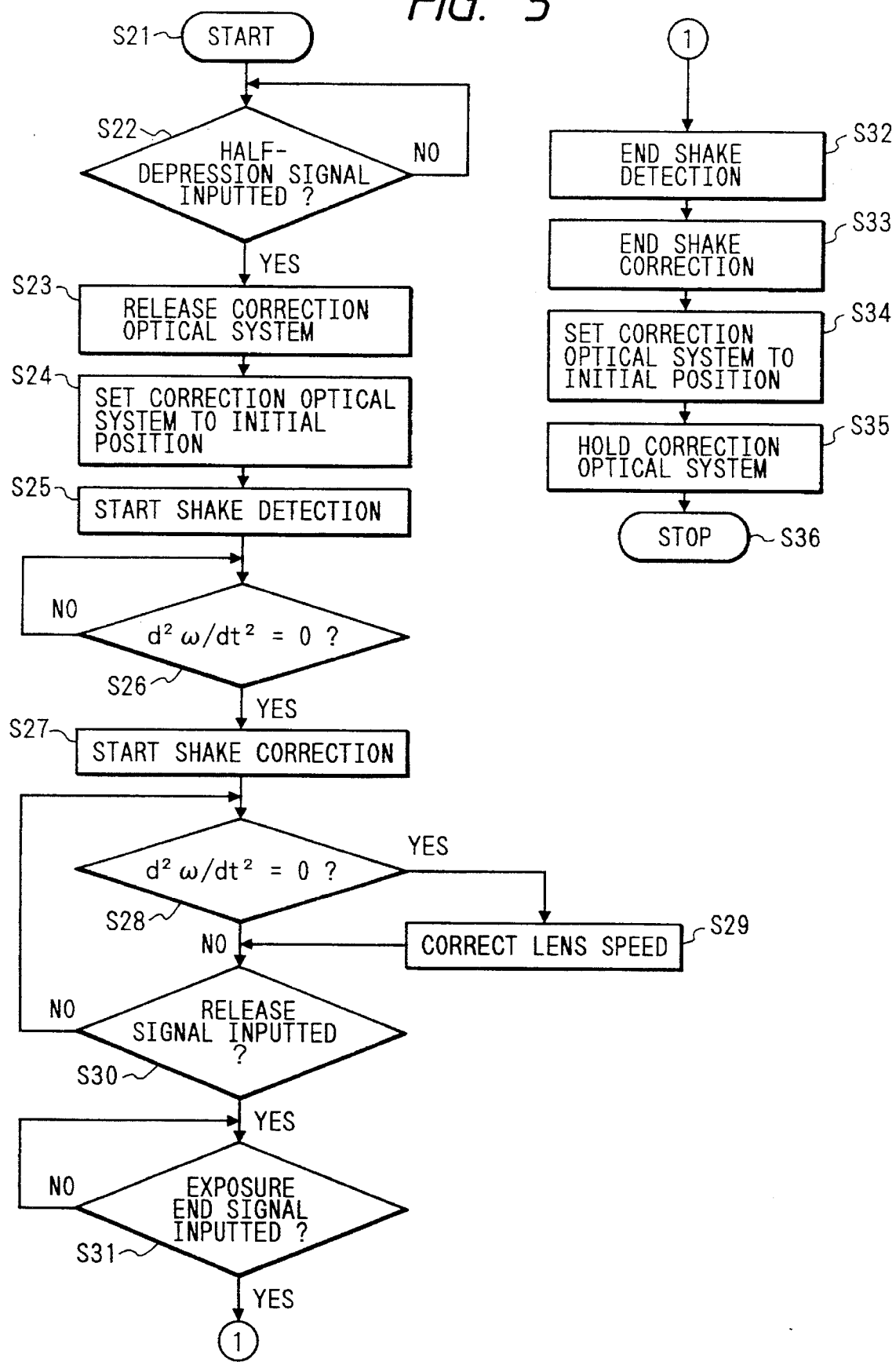
FIG. 5 is a flowchart for the operation of a lens according to the embodiment.

Now, the operation of the lens according to this embodiment of the invention will be described with reference to the flowchart in FIG. 5.

(Step S22)

The operation stands by until the half-depression signal from the CPU 11 is applied.

(Step S23)

When the half-depression signal from the CPU 11 is applied, the correction optical system including the correcting optical system, and so on which has been held is released (that is, the correction optical system including the correcting optical system and so on is released so that it can be driven).

(Step S24)

The correction optical system including the correcting lens 3 is set to the initial position.

(Step S25)

The shake detection sensor 1 starts detecting the angular velocity of the shake.

(Step S26)

The angular velocity output from the shake detection sensor 1 is differentiated twice by the differentiator 6 to obtain the differential value of the angular acceleration. The operation stands by until the differential value of the angular acceleration becomes equal to 0.

(Step S27)

When the differential value of the angular acceleration obtained in Step S26 becomes equal to 0, that is, when the angular velocity can be considered to be equal to 0 for the reason described before, the motor 5 drives the correcting lens 3 from the initial position, thereby starting correction of the shake.

(Step S28)

The angular velocity output from the shake detection sensor 1 is differentiated twice by the differentiator 6 to obtain the differential value of the angular acceleration, and whether the resultant differential value of the angular acceleration is equal to 0 or not is judged.

(Step S29)

When the differential value of the angular acceleration is judged to be equal to 0 in Step S28, the velocity of the correcting lens 3 is set to be 0 to correct the velocity.

(Step S30)

In the case where the differential value of the angular acceleration is judged to be other than 0 in Step S28, or where the correction optical system is set to the initial position in Step S29, whether the release signal from the CPU 11 is received or not is judged. If the release signal from the CPU 11 is not received, the operation in Step S28 and Step S29 will be repeated until the release signal is applied.

(Step S31)

When the release signal from the CPU 11 is judged in Step S30, the operation stands by until the exposure end signal from the CPU 11 is applied.

(Step S32)

When the exposure end signal from the CPU 11 is received in Step S31, the shake detection sensor 1 stops detection of the amount of the shake.

(Step S33)

The motor 5 for correction is stopped and the correction of the shake is finished.

(Step S34)

The correction optical system including the correcting lens, and so on is set to the initial position.

(Step S35)

The correction optical system including the correcting lens 3 is held so as not to be driven.

Note that, though the angular velocity is detected in the above-mentioned embodiment, similar effects can be obtained with respect to the velocity.

According to the present invention, whether the angular velocity is equal to 0 or not can be judged even when the output of the angular velocity sensor for shake detection drifts. Accordingly, whether the sensor stands still or not can be judged, and the angular velocity or the velocity can be exactly detected. Thus, an error of correction of the velocity or the acceleration of the angular velocity sensor for the shake detection is not generated.

What is claimed is:

1. A camera having a function of correcting shake, comprising:

shake velocity detection means for detecting the velocity of a shake caused by an unintentional movement of hands in taking picture;

a differentiating means for differentiating twice a detection signal of an shake detection by said shake velocity detection means in order to obtain the amount of change per unit of time of the acceleration of the shake;

shake correcting lens which can be driven to correct the shake;

a shake correction amount calculating means for calculating an amount of shake correction based on the detection signal from said shake velocity detection means;

correcting lens drive means for driving said shake correcting lens in a proper direction according to the amount of correction calculated by said shake correction amount calculating means so that a blurred image is not obtained; and means for correcting an output from said shake velocity detection means by setting the velocity of the shake caused by the movement of the hands to be equal to 0 when the output of said differentiating means is equal to 0.

2. A camera according to claim 1, wherein said correcting lens drive means starts driving said shake correcting lens to correct the shake after the output of said shake velocity detection means is corrected.

3. A camera according to claim 2, wherein a release operation is executed after said correcting lens drive means drives said shake correcting lens to correct the shake.

4. A camera having a function of correcting a shake according to claim 1, wherein a release operation is started after said output correcting means corrects the output of said shake velocity detection means.

5. A camera having a function of correcting shake, comprising:

shake velocity detection means for detecting a velocity of a shake caused by unintentional movement during a phototaking operation;

differentiating means for differentiating twice a detection signal of the shake detection by said shake velocity detection means in order to obtain an amount of change in the acceleration of the shake per unit of time;

a shake correcting lens which can be driven to correct the shake;

shake correction amount calculating means for calculating an amount of shake correction based on the detection signal from said shake velocity detection means;

correcting lens drive means for driving said shake correcting lens in a proper direction according to the amount of correction calculated by said shake correction amount calculating means so that a blurred image is not obtained; and means for correcting an output from said shake velocity detection means in accordance with an output from said differentiating means.

6. A camera according to claim 5, wherein said correcting lens drive means starts driving said shake correcting lens to correct the shake after the output of said shake velocity detection means is corrected.

7. A camera according to claim 5, wherein a release operation is executed after said correcting lens drive means drives said shake correcting lens to correct the shake.

8. A camera according to claim 5, wherein a release operation is started after said output correcting means corrects the output of said shake velocity detection means.

9. A camera having a function of correcting shake, comprising:

a shake velocity detector which detects a velocity of a shake caused by an unintentional movement of a hand in taking a picture;

a differentiator by which a detection signal of the shake detection by said shake velocity detector is differentiated at least to obtain an acceleration of the shake;

a shake correcting lens which can be driven to correct the shake;

a shake correction amount calculator which calculates an amount of shake correction based on the detection signal from said shake velocity detector;

a correcting lens driver which drives said shake correcting lens in a proper direction in accordance with the amount of correction calculated by said shake correction amount calculator so that a blurred image is not obtained; and a correcting device which corrects an output from said shake velocity detector in accordance with an output from said differentiator.

10. A camera according to claim 9, wherein said correcting lens driver starts driving said shake correcting lens to correct the shake after the output from said shake velocity detector has been corrected.

11. A camera according to claim 9, wherein a release operation is started after said correcting lens driver drives said shake correcting lens to correct the shake.

12. A camera according to claim 9, wherein a release operation is started after said correcting device has corrected the output from said shake velocity detector.

13. A camera having a function of correcting a shake, comprising:

a shake velocity detector which detects a velocity of a shake caused by an unintentional movement of a hand in taking a picture;

a differentiator which differentiates twice a detection signal of the shake detection from said shake velocity detector in order to obtain an amount of change per unit of time of acceleration of the shake;

a shake correcting lens which can be driven to correct the shake;

a shake correction amount calculator which calculates an amount of shake correction based on the detection signal from said shake velocity detector;

a correcting lens drive device which drives said shake correcting lens in a proper direction according to the amount of correction calculated by said shake correction amount calculator so that a blurred image is not obtained; and a correction device which corrects an output from said shake velocity detector by setting the velocity of the shake caused by the movement of the hand to be equal to 0 when the output of said differentiator is equal to 0.

14. A camera according to claim 13, wherein said correcting lens drive device starts driving said shake correcting lens to correct the shake after the output of said shake velocity detector is corrected.

15. A camera according to claim 14, wherein a release operation is executed after said correcting lens drive device drives said shake correcting lens to correct the shake.

16. A camera having a function of correcting a shake according to claim 13, wherein a release operation is started after said correction device corrects the output of said shake velocity detector.

17. A camera having a function for correcting shake, comprising:

a shake velocity detector which detects a velocity of a shake caused by unintentional movement during a phototaking operation;

a differentiator which differentiates twice a detection signal of the shake detection from said shake velocity detector in order to obtain an amount of change in acceleration of the shake per unit of time;

a shake correction amount calculator for calculating an amount of shake correction based on the detection signal from said shake velocity detector;

a correcting lens drive which drives said shake correcting lens in a proper direction according to the amount of correction calculated by said shake correction amount calculator so that a blurred image is not obtained; and a correction device which corrects an output from said shake velocity detector in accordance with an output from said differentiator.

18. A camera according to claim 17, wherein said correcting lens drive starts driving said shake correcting lens to correct the shake after the output of said shake velocity detector is corrected.

19. A camera according to claim 17, wherein a release operation is executed after said correcting lens drive drives said shake correcting lens to correct the shake.

20. A camera according to claim 17, wherein a release operation is started after said correction device corrects the output of said shake velocity detector.

21. A camera having a function of correcting shake, comprising:

shake angular velocity detection means for detecting the angular velocity of a shake caused by an unintentional movement of hands in taking a picture;

differentiating means for differentiating twice a detection signal of the shake detection by said shake angular velocity detection means in order to obtain an amount of change per unit of time of the angular acceleration of the shake;

a shake correcting lens which can be driven to correct the shake;

shake correction amount calculating means for calculating an amount of shake correction based on the detection signal from said shake angular velocity detection means;

correcting lens drive means for driving said shake correcting lens in a proper direction according to the amount of correction calculated by said shake correction amount calculating means so that a blurred image is not obtained; and means for correcting an output from said shake angular velocity detection means by setting the angular velocity of the shake caused by the movement of the hands to be equal to 0 when the output of said differentiating means is equal to 0.

22. A camera according to claim 21, wherein said correcting lens drive means starts driving said shake correcting lens to correct the shake after the output of said shake angular velocity detection means is corrected.

23. A camera according to claim 22, wherein a release operation is executed after said correcting lens drive means drives said shake correcting lens to correct the shake.

24. A camera according to claim 22, wherein a release operation is started after said output correcting means corrects the output of said shake angular velocity detection means.

25. A camera having a function of correcting shake, comprising:

shake angular velocity detection means for detecting an angular velocity of a shake caused by unintentional movement during a phototaking operation;

differentiating means for differentiating twice a detection signal of the shake detection by said shake angular velocity detection means in order to obtain an amount of change in the angular acceleration of the shake per unit of time;

a shake correcting lens which can be driven to correct the shake;

shake correction amount calculating means for calculating an amount of shake correction based on the detection signal from said shake angular velocity detection means;

correcting lens drive means for driving said shake correcting lens in a proper direction according to the amount of correction calculated by said shake correction amount calculating means so that a blurred image is not obtained; and means for correcting an output from said shake angular velocity detection means in accordance with an output from said differentiating means.

26. A camera according to claim 25, wherein said correcting lens drive means starts driving said shake correcting lens to correct the shake after the output of said shake angular velocity detection means is corrected.

27. A camera according to claim 25, wherein a release operation is executed after said correcting lens drive means drives said shake correcting lens to correct the shake.

28. A camera according to claim 25, wherein a release operation is started after said output correcting means corrects the output of said shake angular velocity detection means.

29. A camera having a function of correcting shake, comprising:

a shake angular velocity detector which detects an angular velocity of a shake caused by an unintentional movement of a hand in taking a picture;

a differentiator by which a detection signal of the shake detection by said shake angular velocity detector is differentiated at least to obtain an angular acceleration of the shake;

a shake correcting lens which can be driven to correct the shake;

a shake correction amount calculator which calculates an amount of shake correction based on the detection signal from said shake angular velocity detector;

a correcting lens driver which drives said shake correcting lens in a proper direction in accordance with the amount of correction calculated by said shake correction amount calculator so that a blurred image is not obtained; and a correcting device which corrects an output from said shake angular velocity detector in accordance with an output from said differentiator.

30. A camera according to claim 29, wherein said correcting lens driver starts driving said shake correcting lens to correct the shake after the output from said shake angular velocity detector has been corrected.

31. A camera according to claim 29, wherein a release operation is started after said correcting lens driver drives said shake correcting lens to correct the shake.

32. A camera according to claim 29, wherein a release operation is started after said correcting device has corrected the output from said shake angular velocity detector.

33. A camera having a function of correcting shake, comprising:

a shake angular velocity detector which detects an angular velocity of a shake caused by an unintentional movement of a hand in taking a picture;

a differentiator which differentiates twice a detection signal of the shake detection from said shake angular velocity detector in order to obtain an amount of change per unit of time of angular acceleration of the shake;

a shake correcting lens which can be driven to correct the shake;

a shake correction amount calculator which calculates an amount of shake correction based on the detection signal from said shake angular velocity detector;

a correcting lens drive device which drives said shake correcting lens in a proper direction according to the amount of correction calculated by said shake correction amount calculator so that a blurred image is not obtained; and a correction device which corrects an output from said shake angular velocity detector by setting the angular velocity of the shake caused by the movement of the hand to be equal to 0 when the output of said differentiator is equal to 0.

34. A camera according to claim 33, wherein said correcting lens drive device starts driving said shake correcting lens to correct the shake after the output of said shake angular velocity detector is corrected.

35. A camera according to claim 34, wherein a release operation is executed after said correcting lens drive device drives said shake correcting lens to correct the shake.

36. A camera having a function of correcting a shake according to claim 33, wherein a release operation is started after said correction device corrects the output of said shake angular velocity detector.

37. A camera having a function for correcting shake, comprising:

a shake angular velocity detector which detects an angular velocity of a shake caused by unintentional movement during a phototaking operation;

a differentiator which differentiates twice a detection signal of the shake detection from said shake angular velocity detector in order to obtain an amount of change in angular acceleration of the shake per unit of time;

a shake correction amount calculator for calculating an amount of shake correction based on the detection signal from said shake angular velocity detector;

a correcting lens drive which drives said shake correcting lens in a proper direction according to the amount of correction calculated by said shake correction amount calculator so that a blurred image is not obtained; and a correction device which corrects an output from said shake angular velocity detector in accordance with an output from said differentiator.

38. A camera according to claim 37, wherein said correcting lens drive device starts driving said shake correcting lens to correct the shake after the output of said shake angular velocity detector is corrected.

39. A camera according to claim 37, wherein a release operation is executed after said correcting lens drive drives said shake correcting lens to correct the shake.

40. A camera according to claim 37, wherein a release operation is started after said correction device corrects the output of said shake angular velocity detector.

41. A camera having a shake correcting function, comprising:

a shake velocity detection device which detects shake velocity caused by unintentional shake during a phototaking operation;

a first differentiating device for differentiating a detection signal of the shake detection by said shake velocity detection device in order to obtain at least an acceleration;

a second differentiating device for differentiating an output of said first differentiating device;

a shake correcting lens which can be driven to correct the shake;

a shake correction amount calculating device for calculating an amount of shake correction based on the detection signal from said shake velocity detection device;

a correcting lens drive device for driving said shake correcting lens in a proper direction according to the amount of correction calculated by said shake correction amount calculating device so that a blurred image is not obtained; and a correcting device which corrects an output from said shake velocity detection device in accordance with an output from said second differentiating device.

42. A camera according to claim 41, wherein said correcting lens drive device starts driving said shake correcting lens to correct the shake after the output of said shake velocity detection device is corrected.

43. A camera according to claim 41, wherein a release operation is started after said correcting lens is driven by said correcting lens drive device.

44. A camera according to claim 41, wherein a release operation is started after the output from said shake velocity detection device is corrected by said correcting device.

* * * * *